US008237759B2

(12) United States Patent
Hwang

(10) Patent No.: US 8,237,759 B2
(45) Date of Patent: Aug. 7, 2012

(54) LIGHT SCANNING UNIT AND IMAGE FORMING APPARATUS COMPRISING THE SAME

(75) Inventor: Ho-Hyun Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 447 days.

(21) Appl. No.: 12/475,861

(22) Filed: Jun. 1, 2009

(65) Prior Publication Data

US 2009/0316244 A1 Dec. 24, 2009

(30) Foreign Application Priority Data

Jun. 18, 2008 (KR) ........................ 10-2008-0057487

(51) Int. Cl.
*B41J 2/47* (2006.01)
(52) U.S. Cl. ........................................ 347/235; 347/234
(58) Field of Classification Search .................. 347/237, 347/247, 234, 235
See application file for complete search history.

(56) References Cited

U.S. PATENT DOCUMENTS

| 5,233,368 | A | * | 8/1993 | Yamanaka et al. ............ 347/132 |
| 6,288,818 | B1 | * | 9/2001 | Yoshimaru ................. 359/204.1 |
| 6,330,020 | B1 | * | 12/2001 | Kamioka ...................... 347/241 |
| 6,342,963 | B1 | * | 1/2002 | Yoshino ..................... 359/204.1 |
| 7,471,307 | B2 | * | 12/2008 | Iwamoto .................... 359/204.1 |
| 7,515,322 | B2 | * | 4/2009 | Suga .......................... 359/206.1 |
| 7,639,411 | B2 | * | 12/2009 | Mukai ........................ 359/205.1 |
| 2005/0231476 | A1 | * | 10/2005 | Armstrong ................... 345/161 |
| 2006/0279826 | A1 | * | 12/2006 | Kim ............................. 359/204 |
| 2009/0080915 | A1 | * | 3/2009 | Hashimoto .................... 399/39 |

* cited by examiner

*Primary Examiner* — Julian Huffman
*Assistant Examiner* — Sharon A Polk
(74) *Attorney, Agent, or Firm* — Stanzione & Kim, LLP

(57) ABSTRACT

A light scanning unit that includes: a light source unit for emitting first and second light beams; a beam deflector for deflecting the first and second light beams emitted from the light source unit; synchronization detection sensors for detecting scanning synchronization of the first and second light beams; and synchronization optical path converting members to deflect the first and second light beams toward the synchronization detection sensors. The optical paths of the portions of the first and second light are directed to come into close proximity with one another. The light scanning unit may be incorporated in an image forming apparatus.

26 Claims, 5 Drawing Sheets

LIGHT SCANNING UNIT AND IMAGE FORMING APPARATUS COMPRISING THE SAME

CROSS-REFERENCE TO RELATED PATENT APPLICATION

This application claims the benefit of Korean Patent Application No. 10-2008-0057487, filed on Jun. 18, 2008 in the Korean Intellectual Property Office, the disclosure of which is incorporated herein in its entirety by reference.

TECHNICAL FIELD

The present disclosure relates to a light scanning unit and an image forming apparatus comprising the same, and more particularly, to a light scanning unit having a synchronization detection unit for detecting synchronization signals, with an improved arrangement, and an image forming apparatus comprising the light scanning unit.

BACKGROUND

Light scanning units generally scan laser beams on a photosensitive drum in an image forming apparatus such as a laser printer, a copying machine, a facsimile machine, or the like that reproduces images on printing media to form electrostatic latent images.

A light scanning unit may comprise a light source unit, a polygon mirror, and a detection unit for synchronization purposes to obtain horizontal synchronization signals of light that is scanned due to the rotation of the polygon mirror. Particularly, in a tandem light scanning unit, which is used in a color image forming apparatus, two laser beams may be emitted from the light source unit and deflected by a polygon mirror. Thus, when two laser beams are deflected by a common polygon mirror, due to being affected by the arrangement of the synchronization detecting unit, the starting position of scanning lines may be unstable due to error in spacing angles of the polygon mirror, or a complex optical system of the detection unit for synchronization of the laser beams may be required. Therefore, it is desirable to design an improved light scanning unit that may be incorporated into an image forming apparatus.

SUMMARY

According to one aspect, a light scanning unit comprises: a light source unit for emitting first and second light; a beam deflector for deflecting the first and second light emitted from the light source unit; and a synchronization detection optical system comprising first and second synchronization detection sensors for detecting scanning synchronization of the first and second light, and a plurality of synchronization optical path converting members for converting optical paths of portions of the first and second light, which are deflected by the beam deflector. The optical paths of the portions of the first and second light are directed to come into close proximity with one another such that the first and second synchronization detection sensors may be mountable in a single circuit component. The first and second synchronization detection sensors may be disposed on either surface of one print circuit board.

First and second synchronization detection lenses may be respectively disposed in front of the first and second synchronization detection sensors, and the first and second synchronization detection lenses may be of the same kind.

The beam deflector may be a polygon mirror having a plurality of deflection surfaces, and the first and second light may be deflected on different deflection surfaces of the beam deflector. The beam deflector may deflect light for scanning and light for synchronization detection on the same deflection surface.

The first and second synchronization detection sensors may detect a beam at a starting end among both ends of the first and second light scanned in a main scanning direction, which are deflected by the beam deflector. The first and second synchronization detection sensors may be disposed diagonal-symmetrically with respect to the polygon mirror.

The light scanning unit may further comprise an image forming optical system comprising first and second sub-image forming optical systems that respectively focus the first and second light deflected by the beam deflector. The first and second sub-image forming optical systems may comprise at least one f–θ lens.

The plurality of synchronization optical path converting members may be disposed on the optical path between the beam deflector and the image forming optical systems.

The light source unit, the beam deflector, the synchronization detection optical system, and the image forming optical systems may be installed within one housing.

The light scanning unit may further comprise a scanning optical path converting member for converting optical paths such that the first and second light deflected by the beam deflector can be emitted from one side of the housing.

The scanning optical path converting member may be disposed on an optical path between the beam deflector and the image forming optical systems. The plurality of the optical path converting members may be disposed on an optical path between the scanning optical path converting member and the image forming optical system.

According to yet another aspect, an image forming apparatus may comprise: a light scanning unit comprising: a light source unit for emitting first and second light; a beam deflector for deflecting the first and second light emitted from the light source unit; and a synchronization detection optical system comprising first and second synchronization detection sensors for detecting scanning synchronization of the first and second light, and a plurality of synchronization optical path converting members for converting optical paths of portions of the first and second light, which are deflected by the beam deflector. Optical paths of the portions of the first and second light may be directed to come into close proximity with one another such that the first and second synchronization detection sensors may be mountable in a single circuit component. The image forming apparatus may also include a surface to be scanned, on which light beams are scanned from the light scanning unit and electrostatic latent images are formed; a developing unit for developing the electrostatic latent images; and a transfer unit to which the images developed by the developing unit are transferred.

BRIEF DESCRIPTION OF THE DRAWINGS

Various features and advantages of the disclosure will become more apparent by the following detailed description of several embodiments thereof with reference to the attached drawings, of which.

DETAILED DESCRIPTION OF SEVERAL EMBODIMENTS

Figure 1:
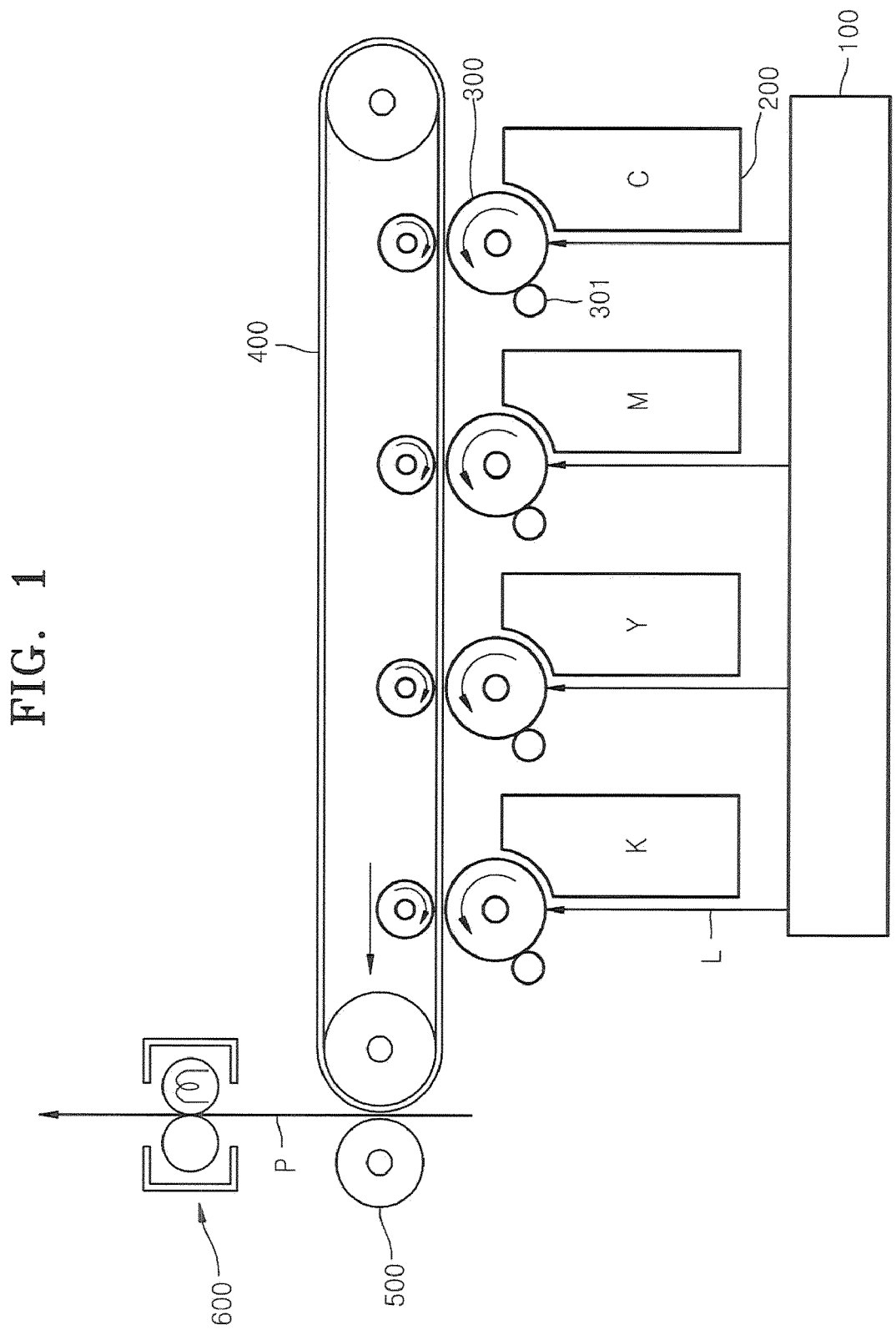
FIG. 1 illustrates an image forming apparatus according to an embodiment.

Reference will now be made in detail to embodiments of the present invention, examples of which are illustrated in the accompanying drawings, wherein like reference numerals refer to like elements. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding.

FIG. 1 is a schematic view of an image forming apparatus according to an embodiment. Referring to FIG. 1, the image forming apparatus may include a light scanning unit 100, a developing unit 200, a photosensitive drum 300, a charging roller 301, an intermediate transfer belt 400, a transfer roller 500, and a fixing unit 600.

The light scanning unit 100 may scan light L, which may be modulated based on image information, to a photosensitive drum 300. The photosensitive drum 300 is an example of a photosensitive body which may comprise, for example, a photosensitive layer having a predetermined thickness coated on a circumferential surface of a cylindrical metal pipe. The circumferential surface of the photosensitive drum 300 corresponds to a surface to be scanned, on which the light L scanned by the light scanning unit 100 is focused. Also, a photosensitive belt may be applied as a photosensitive body. The charging roller 301 is an example of a charging device that contacts the photosensitive drum 300 and rotates around the photosensitive drum 300 to charge the surface of the photosensitive drum 300 with uniform potential. A charging bias Vc may be applied to the charging roller 301. Alternatively, a corona charger (not shown) may be used instead of the charging roller 301. Toner is accommodated inside the developing unit 200. Toner may be moved to the photosensitive drum 300 by a development bias applied between the developing unit 200 and the photosensitive drum 300, thereby developing electrostatic latent images into a visible toner image. A toner image formed on the photosensitive drum 300 is transferred to the intermediate transfer belt 400. The toner image is transferred to paper P which is transported between the transfer roller 500 and the intermediate transfer belt 400 by a transfer bias applied to the transfer roller 500. The toner image that is transferred to the paper P receives heat and pressure from the fixing unit 600 to be fixed on the paper P, thereby forming an image.

In order to print a color image, the light scanning unit 100 scans four beams of light L to the four photosensitive drums 300, respectively. In the four photosensitive drums 300, electrostatic latent images corresponding to image information of black (K), magenta (M), yellow (Y), and cyan (C) are formed. Four developing units 200 respectively supply toner of black (K), magenta (M), yellow (Y), and cyan (C) to the photosensitive drums 300 to form toner images of black (K), magenta (M), yellow (Y), and cyan (C) colors. The toner images of black (K), magenta (M), yellow (Y), and cyan (C) are transferred to the intermediate transfer belt 400, while being overlapped with one another, and then they are transferred to the paper P.

Figure 2:
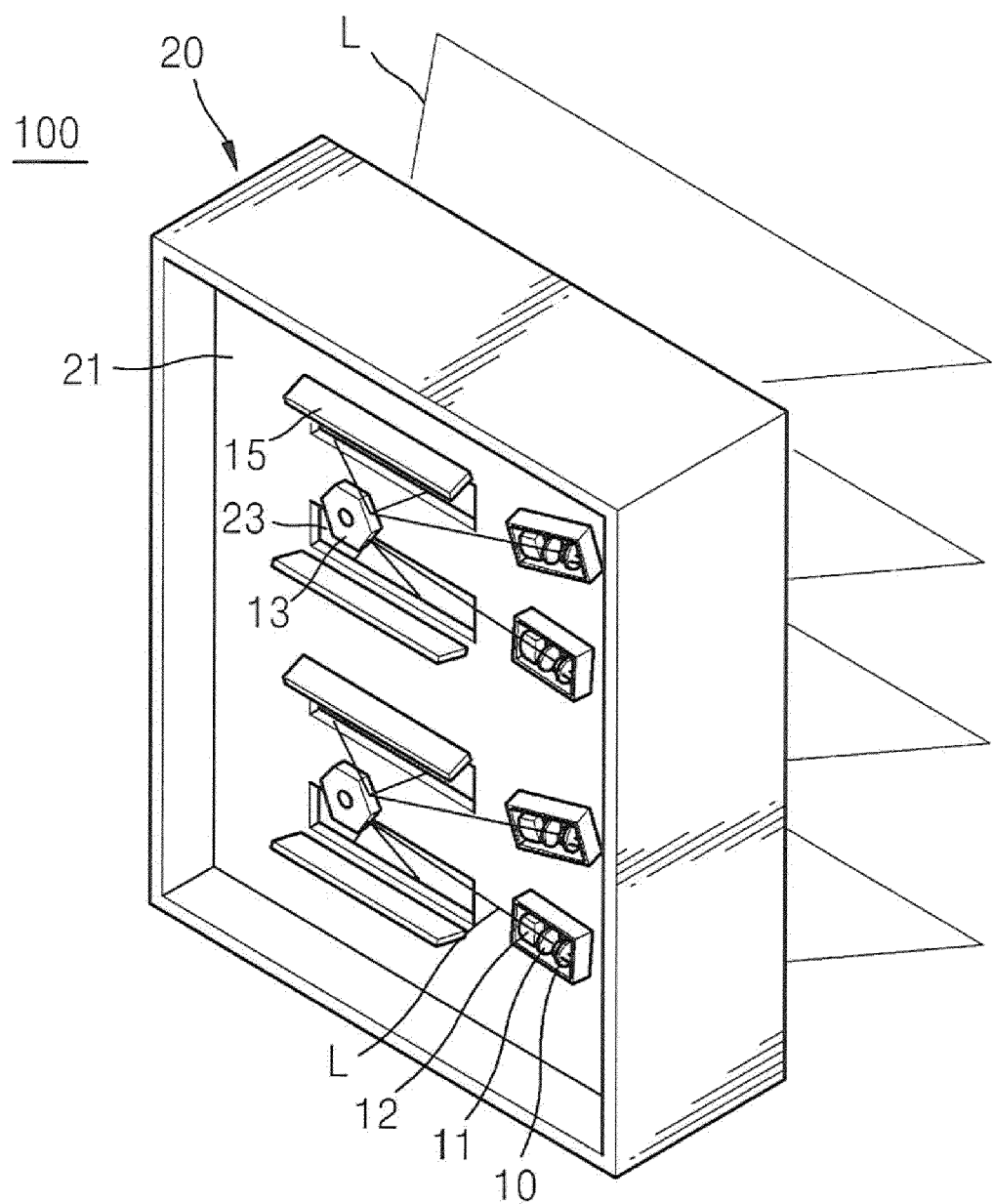
FIG. 2 is a perspective view of a light scanning unit.
Figure 3:
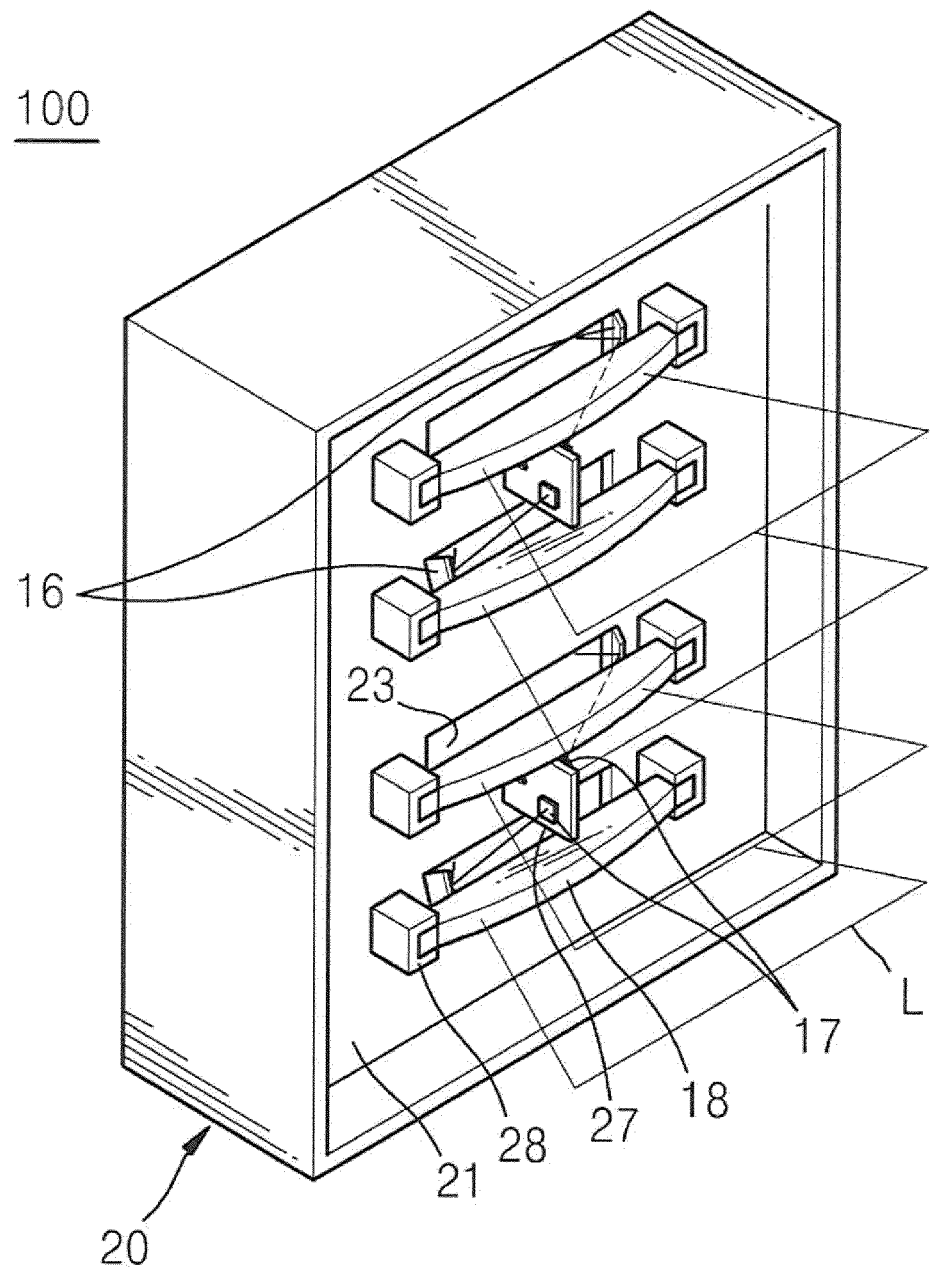
FIG. 3 is a perspective view of the light scanning unit of FIG. 2 from the opposite direction.

FIGS. 2 and 3 illustrate a light scanning unit 100 according to an embodiment. FIGS. 2 and 3 are perspective views of the light scanning unit 100 as seen from different directions.

Referring to FIGS. 2 and 3, the exemplary light scanning unit 100 includes light sources 10, polygon mirrors 13, synchronization detection sensors 17, scanning lenses 18, and a housing 20 in which these optical components are installed. Additionally, the exemplary light scanning unit 100 includes synchronization optical path converting members 16, for converting optical paths such that some of light deflected by the polygon mirrors 13 is directed to the synchronization detection sensors 17, and scanning optical path converting members 15, for converting the optical path of light that is deflected by the polygon mirror 13 such that the light may be scanned out from one side of the housing 20.

The light sources 10, the polygon mirrors 13, and the scanning optical path converting members 15 may be arranged on one side of the housing 20, while the synchronization optical path converting members 16, the synchronization detection sensors 17, and the scanning lenses 18 may be arranged on the other side of the housing 20, for example. A supporting portion 21 may be formed between the sides of the housing 20 to allow the optical components to be mounted therein. Opening portions 23 may be formed in the supporting portion 21, so that light reflected in the scanning optical path converting members 15 can be directed to the other side of the housing 20.

The light sources 10 may be, for example, laser diodes for emitting laser light. Each polygon mirror 13 may be a beam deflector configured for deflecting and scanning light L emitted from the light sources 10 and may be formed with a plurality of deflection surfaces for rotation by a motor (not shown). In an embodiment, each polygon mirror 13 may be a hexagonal mirror, as illustrated in FIG. 2, but the polygon mirrors 13 are not limited thereto. For example, the polygon mirrors 13 may be square, pentagonal, or heptagonal mirrors. In the current embodiment, two polygon mirrors 13 are provided for deflecting two laser light using different deflection surfaces. However, fewer or more polygon mirrors 13 may be incorporated in the light scanning unit 10. Moreover, the polygon mirrors 13 are not limited to the same type of shape. Thus, one polygon mirror 13 may be hexagonal while a second may be pentagonal, for example.

A collimating lens 11 and a cylindrical lens 12 may be disposed on an optical path between the light source 10 and the polygon mirror 13. The collimating lens 11 collimates, or straightens, light emitted from the light source 10 to be parallel light or converging light. The cylindrical lens 12 collimates light that has passed through the collimating lens 11 in a direction corresponding to a main scanning direction and/or sub-scanning direction to condense or contract the light incident on the polygon mirror 13. The cylindrical lens 12 may be formed of at least one lens.

A scanning lens 18 may serve as an image forming optical system configured to focus light deflected by the polygon mirror 13 on a surface to be scanned, such as, for example, the circumferential surface of the photosensitive drum 300 illustrated in FIG. 1. For example, the scanning lens 18 may be an f-.theta. lens that allows light to be focused on the surface to be scanned in a main scanning direction at uniform linear speed. The scanning lens 18 may be secured by holder 28 attached to the supporting portion 21. The image forming optical system may include one scanning lens 18 on each optical path; however, the optical structure of the image forming optical system may be modified in various manners. For example, the image forming optical system may comprise two or more scanning lenses.

A synchronization detection optical system may comprise a synchronization optical path converting member 16 and a synchronization detection sensor 17. The synchronization detection optical system may detect a synchronization of light, which is deflected by the polygon mirror 13 in a main scanning direction. The synchronization optical path converting member 16 may be disposed on each path of laser light between the polygon mirror 13 and the synchronization detection sensor 17 to direct light among the deflected light in the polygon mirror 13 to the synchronization detection sensor 17. In the current embodiment, the synchronization optical path converting member 16 is formed of one reflection mirror; however, the synchronization optical path converting member 16 may be formed of one or more lenses. Additionally, the optical paths may be changed using total reflection of a prism, for example. Synchronization detection lens 40 (FIG. 4) for collimating light for synchronization detection may be interposed between the synchronization optical path converting members 16 and the synchronization detection sensors 17. The synchronization detection lens 40 may be formed of one or more lenses.

Figure 4:
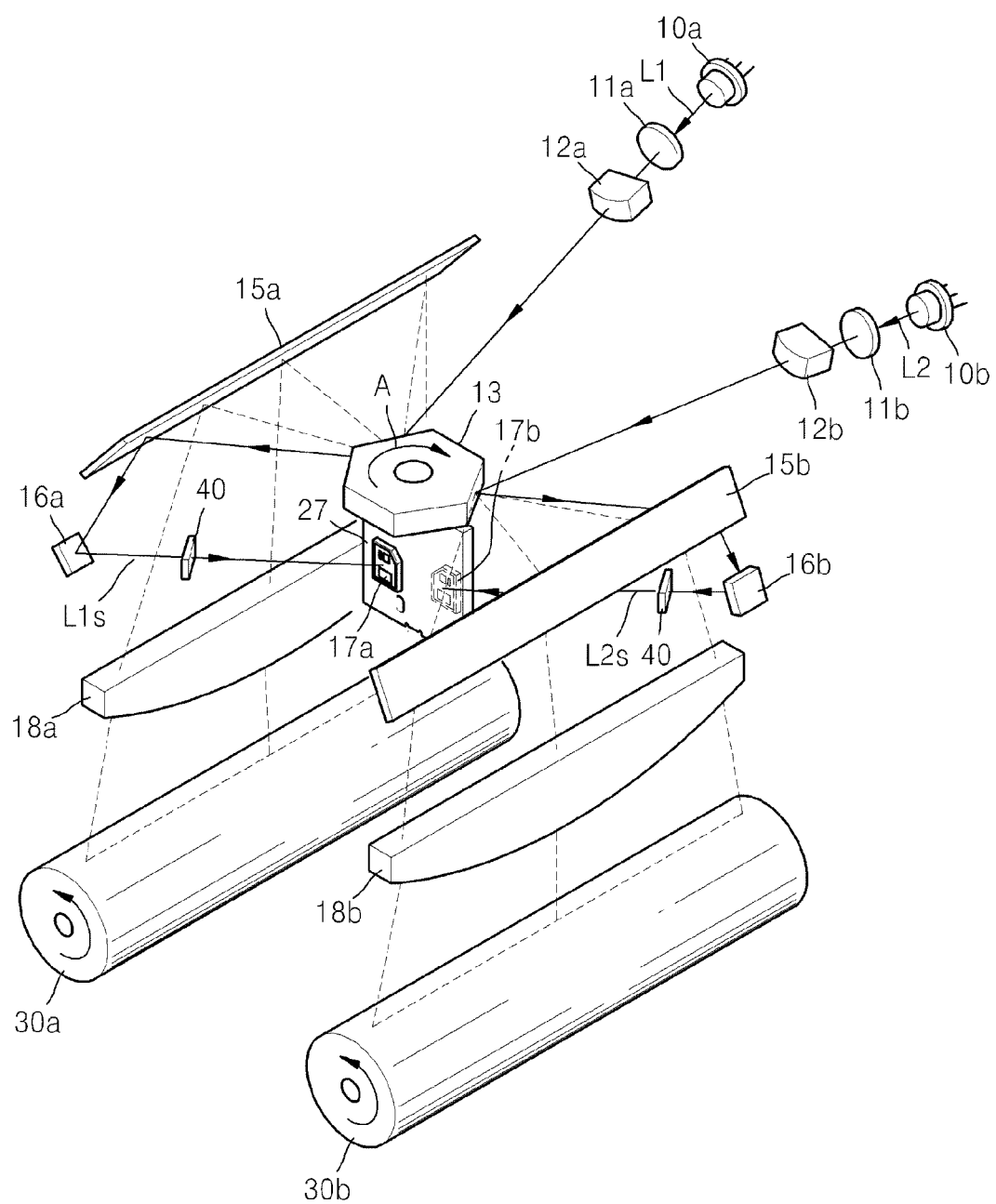
FIG. 4 schematically illustrates the optical arrangement of an exemplary light scanning unit.

FIG. 4 schematically illustrates an optical arrangement of an exemplary light scanning unit 100. Referring to FIG. 4, optical paths L1s and L2s of the light that is deflected by one polygon mirror 13 may be arranged substantially diagonal-symmetrically with respect to the polygon mirror, and thus the synchronization detection lenses may be of the same kind.

The synchronization detection optical system may be arranged to detect light beams at a starting end in a main scanning direction of light L that is deflected by the polygon mirror 13. The synchronization optical path converting member 16 may be disposed on an optical path at a starting position of scanning of light L that is deflected on one deflection surface of the polygon mirror 13. The synchronization detection optical system is arranged such that light for scanning and light for synchronization detection thereof are deflected by the same deflection surface of the polygon mirror 13.

With reference to FIG. 4, the light scanning unit may employ a cross-scanning structure in which two light sources 10a and 10b and one polygon mirror 13 comprise one set. In the cross-scanning method, first and second synchronization optical path converting members 16a and 16b may be arranged substantially diagonal-symmetrically to be placed in the optical paths at scanning starting positions of light L1 and L2 that are deflected on a deflection surface of the polygon mirror 13. Also, the first and second synchronization optical path converting members 16a and 16b may be arranged around the polygon mirror 13 to allow optical paths L1s and L2s for synchronization detection to face one another, and thus the first and second synchronization detection sensors 17a and 17b may accordingly be disposed adjacent to each other. For example, the first and second synchronization detection sensors 17a and 17b may be formed on two surfaces of a double-sided printed circuit board (PCB) 27 to face away from one another.

Figure 5:
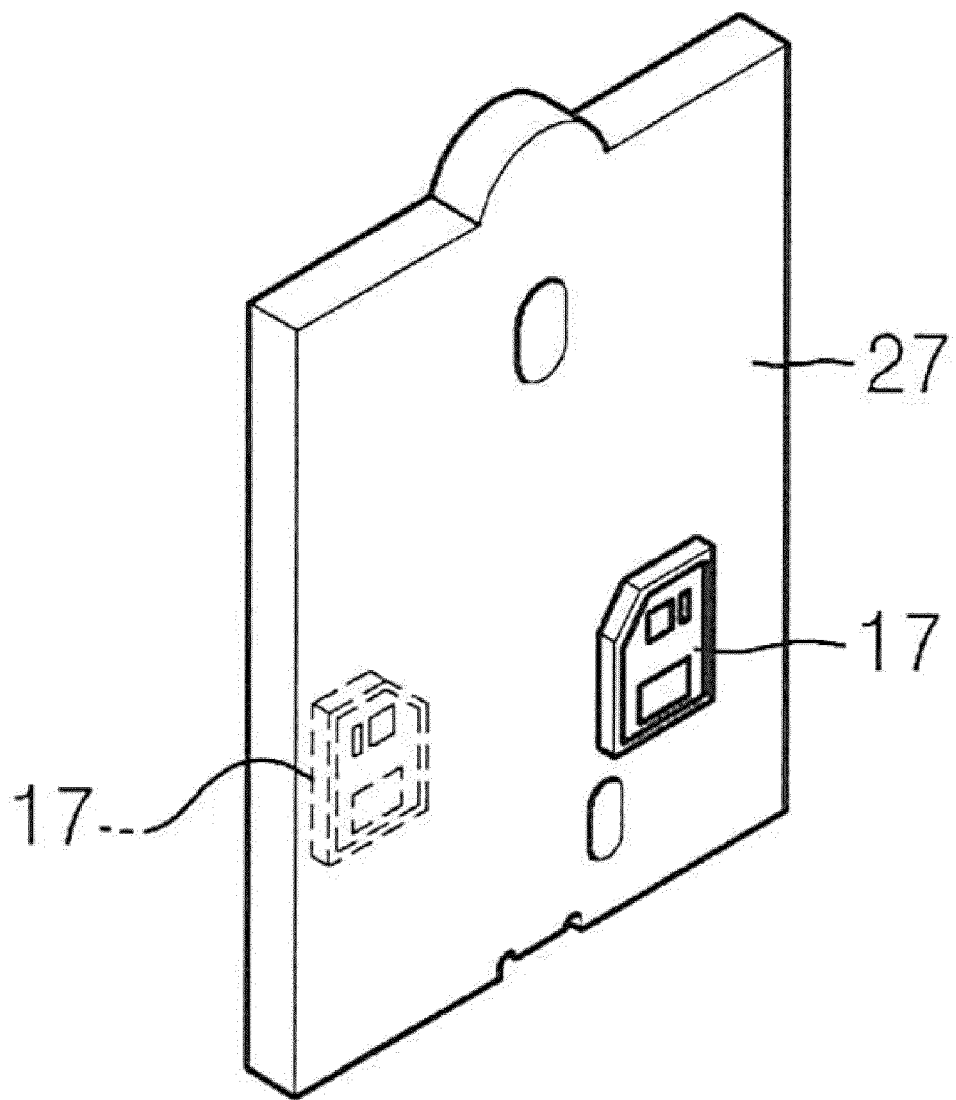
FIG. 5 illustrates an exemplary single circuit component to which a synchronization detection sensor is attached, according to an embodiment.

FIG. 5 illustrates a single circuit component to which a synchronization detection sensor 17 may be attached. As two synchronization detection sensors 17 may be attached on two surfaces of the double-sided PCB 27 as described above, the number of assembly processes may accordingly be reduced compared to when the synchronization detection sensors 17 are mounted in different positions. The double-sided PCB 27 is an example of mounting two synchronization detection sensors 17 in a single circuit component. Alternatively, for example, two single-sided PCBs may be overlapped and two synchronization detection sensors 17 may be mounted on the two single-sided PCBs. In yet another embodiment, a circuit may be formed in a frame of the housing 20 itself to mount two synchronization detection sensors 17.

Referring again to FIG. 4, the operation of the laser scanning unit 100 according to an embodiment is described. Assuming that the polygon mirror 13 rotates clockwise, light L1 emitted from the first light source 10a is deflected by the polygon mirror 13, passes through a first scanning optical path converting member 15a, and is directed to a first synchronization optical path converting member mirror 16a and a first scanning lens 18a. Light reflected on the same deflection surface of the polygon mirror 13 first passes through the first synchronization optical path converting member mirror 16a and is detected by the first synchronization detection sensor 17a, and then passes through the first scanning lens 18a and is scanned to a surface to be scanned, such as a first photosensitive drum 30a.

Light L2 emitted from the second light source 10b is deflected by the polygon mirror 13, passes through a second scanning optical path converting member 15b, and is directed to a second synchronization optical path converting member mirror 16b and a second scanning lens 18b. Light reflected on the same deflection surface of the polygon mirror 13 first passes through the second synchronization optical path converting member mirror 16b and is detected by the second synchronization detection sensor 17b, and then passes through the first scanning lens 18b and is scanned to a surface to be scanned, such as a second photosensitive drum 30b.

The first and second synchronization detection sensors 17a and 17b respectively detect first and second beams of light L1s and L2s for synchronization detection. A first synchronization signal obtained from the first light L1s and a second synchronization signal obtained from the second light L2s may be detected at a predetermined time difference according to the scanning characteristics of the image forming optical system and the position of the synchronization detection sensors 17a and 17b. The time difference between the two synchronization signals may be controlled by controlling time between a synchronization detection signal and a video output signal of a timing chart of the first and second light sources 10a and 10b. In the current embodiment, distances between the first and second synchronization detection sensors 17a and 17b and the first and second light sources 10a and 10b may be the same, and the time difference between the two synchronization signals may be minimized.

As described above, light L1 and L2 respectively emitted from the first and second light sources 10a and 10b are deflected on different deflection surfaces of the polygon mirror 13, and each of the light beams L1 and L2 is deflected on one deflection surface first into light for synchronization detection and then into light for scanning, respectively. In the light scanning unit 100 of the current embodiment, since light for scanning and light for synchronization detection are sequentially deflected on the same deflection surface, error of the starting position of scanning lines due to error of spacing angles, which may be generated in the manufacturing process of a polygon mirror, may be solved optically.

The synchronization detection system may be arranged such that light beams for synchronization detection L1s and L2s do not pass through the first and second scanning lenses 18a and 18b, respectively. Thus, as light L1s and L2s for synchronization detection does not pass through the scanning lenses 18a and 18b, respectively, the first synchronization optical path converting member 16a may be disposed on the optical path between the first scanning optical path converting member 15a and the first scanning lens 18a, while the second synchronization optical path converting member 16b may be disposed on the optical path between the second synchronization optical path member 15b and the second scanning lens 18b. In this case, light incident on the first and second scanning lenses 18a and 18b may be completely scanned to the first and second photosensitive drums 30a and 30b, respectively. Accordingly, the maximum scanning angle of light scanned to the first and second photosensitive drum 30a and 30b may be enlarged.

While the disclosure has been particularly shown and described with reference to several embodiments thereof with particular details, it will be apparent to one of ordinary skill in the art that various changes may be made to these embodiments without departing from the principles and spirit of the invention, the scope of which is defined in the following claims and their equivalents.

What is claimed is:

1. A light scanning unit comprising:
a beam deflector comprising deflection surfaces;
first and second light sources configured to respectively emit first and second light beams to different ones of the deflection surfaces;
first and second synchronization detection sensors mounted on opposing surfaces of a printed circuit board and configured to detect scanning synchronization of the first and second light beams, respectively; and
synchronization optical path converting members to deflect the first and second light beams towards the first and second synchronization detection sensors, after the first and second light beams are deflected by the beam deflector.

2. The light scanning unit of claim 1, wherein optical paths from the light source unit to the first and second synchronization detection sensors are the same length.

3. The light scanning unit of claim 1, further comprising first and second synchronization detection lenses respectively disposed in front of the first and second synchronization detection sensors, wherein the first and second synchronization detection lenses are of the same type of lens.

4. The light scanning unit of claim 1, wherein the beam deflector comprises a polygon mirror having the deflection surfaces.

5. The light scanning unit of claim 4, wherein the beam deflector is configured to scan the first light beam in a single scanning direction and is configured to scan the second light beam in a single scanning direction.

6. The light scanning unit of claim 1, wherein the beam deflector is configured to scan the first and second beams in respective main scanning directions, and
the first and second synchronization detection sensors are disposed so as to respectively detect the first and second beams, at the beginning of each scan.

7. The light scanning unit of claim 1, wherein the first and second synchronization sensors are disposed diagonal-symmetrically with respect to the beam deflector.

8. The light scanning unit of claim 1, further comprising scanning lenses to respectively focus the first and second light beams on first and second photosensitive surfaces,
wherein the beam deflector deflects the first and second beams, such that the first and second light beams are scanned across the first and second photosensitive surfaces.

9. The light scanning unit of claim 8, wherein the synchronization optical path converting members are disposed so as to deflect the first and second beams to the respective first and second synchronization detection sensors, without passing through the scanning lenses.

10. The light scanning unit of claim 8, wherein the scanning lenses comprise at least one f-.theta. lens.

11. The light scanning unit of claim 8, further comprising a housing,
wherein the light source unit, the beam deflector, the first and second synchronization detection sensors, the scanning lenses, and the synchronization optical path converting members are disposed in the housing.

12. The light scanning unit of claim 11, further comprising scanning optical path converting members disposed on optical paths of the first and second beams, such that the first and second light beams are emitted from one side of the housing.

13. The light scanning unit of claim 12, wherein the scanning optical path converting members are disposed on optical paths of the first and second light beams, between the beam deflector and the scanning lenses.

14. The light scanning unit of claim 13, wherein the synchronization optical path converting members are disposed on optical paths of the first and second light beams, between the scanning optical path converting members and the scanning lenses.

15. An image forming apparatus comprising: a light scanning unit comprising:
a light source unit to emit first and second light beams; a beam deflector comprising deflection surfaces and configured to simultaneously scan the first and second light beams, using different ones of the deflection surfaces;
first and second synchronization detection sensors mounted on opposing surfaces of a printed circuit board and configured to detect scanning synchronization of the first and second light beams, respectively;
synchronization optical path converting members to deflect the first and second light beams to the first and second synchronization detection sensors;
a photosensitive surface on which the first and second light beams are scanned to form electrostatic latent images;
a developing unit for developing the electrostatic latent images; and
a transfer unit to which the images developed by the developing unit are transferred.

16. The image forming apparatus of claim 15, wherein optical paths from the light source unit to the first and second synchronization detection sensors are the same length.

17. The image forming apparatus of claim 15, wherein,
the light scanning unit further comprises first and second synchronization detection lenses respectively disposed in front of the first and second synchronization detection sensors, and
the first and second synchronization detection lenses are of the same type of lens.

18. The image forming apparatus of claim 15, wherein the beam deflector comprises a polygon mirror having the deflection surfaces.

19. The image forming apparatus of claim 18, wherein the beam deflector is configured to scan the first light beam in a single scanning direction and is configured to scan the second light beam in a single scanning direction.

20. The image forming apparatus of claim 15, wherein the first and second synchronization sensors are disposed diagonal-symmetrically with respect to the beam deflector.

21. The image forming apparatus of claim 15, further comprising scanning lenses to focus the first and second light beams on the respective photosensitive surfaces.

22. The image forming apparatus of claim 21, wherein the synchronization optical path converting members are disposed so as to deflect the first and second beams to the respective first and second synchronization detection sensors, without passing through the scanning lenses.

23. The image forming apparatus of claim 22, further comprising a housing,
wherein the light source unit, the beam deflector, the first and second synchronization detection optical detectors, the scanning lenses, and the synchronization optical path converting members are disposed in the housing.

24. The image forming apparatus of claim 23, further comprising scanning optical path converting members disposed on optical paths of the first and second beams, such that the first and second light beams are emitted from one side of the housing.

25. The image forming apparatus of claim 24, wherein the scanning optical path converting members are disposed on optical paths of the first and second light beams, between the beam deflector and the scanning lenses.

26. The image forming apparatus of claim 25, wherein the synchronization optical path converting members are disposed on optical paths of the first and second light beams, between the scanning optical path converting members and the scanning lenses.

* * * * *